United States Patent [19]

Tajima

[11] 4,360,909
[45] Nov. 23, 1982

[54] SIGNAL PICKUP DEVICE IN A ROTARY RECORDING MEDIUM REPRODUCING APPARATUS

[75] Inventor: Osamu Tajima, Kanagawa, Japan
[73] Assignee: Victor Company of Japan Ltd., Japan
[21] Appl. No.: 220,530
[22] Filed: Dec. 29, 1980

[30] Foreign Application Priority Data
Dec. 29, 1979 [JP] Japan .................... 54/185160[U]

[51] Int. Cl.³ .................... G11B 3/38; G11B 21/00;
G11B 21/10; G11B 11/02
[52] U.S. Cl. .................... 369/170; 369/126; 369/151
[58] Field of Search .............. 369/170, 171, 172, 173, 369/126, 151

[56] References Cited

U.S. PATENT DOCUMENTS 4,160,268  7/1979  Goto et al. .................... 369/170

FOREIGN PATENT DOCUMENTS 54-55401   5/1979  Japan .................... 369/170
55-28533   2/1980  Japan .................... 369/170
55-122243  9/1980  Japan .................... 369/126
2050037   12/1980 United Kingdom ........ 369/170

*Primary Examiner*—Steven L. Stephan
*Attorney, Agent, or Firm*—Posnack, Roberts, Cohen & Spiecens

[57] ABSTRACT

A signal pickup device comprises a reproducing element for reproducing recorded signals from recording tracks of a rotary recording medium, a holder having said reproducing element mounted at its tip end, a cantilever having the rear end of said holder mounted at its tip end, force applying coil for applying a force to the rear end side of the cantilever so that the reproducing element makes contact with the rotary recording medium having a predetermined pressure, and control coils for applying force at the rear end side of the cantilever so that tracking control is performed, by displacing said reproducing element in a direction perpendicular with respect to the longitudinal direction of the recording tracks of the rotary recording medium. The cantilever, holder and reproducing element constructs a cantilever assembly, the holder forms a plate-shaped member in which the width in the direction substantially parallel to the rotating surface of the rotary recording medium is larger than the length in the direction perpendicular to the rotating surface, and the holder and the cantilever assembly have a first resonance frequency respective of their spring constant and moment of inertia wherein said resonance frequency is selected at a frequency lower than a frequency $f_c$ at which the response of the servo loop open loop characteristic of the control means becomes zero. The above cantilever has the first resonance frequency at the plane substantially parallel to the rotating surface of the rotary recording medium selected at a frequency higher than the frequency $f_c$ at the rear end side thereof.

8 Claims, 8 Drawing Figures

SIGNAL PICKUP DEVICE IN A ROTARY RECORDING MEDIUM REPRODUCING APPARATUS

BACKGROUND OF THE INVENTION

The present invention generally relates to signal pickup devices in rotary recording medium reproducing apparatuses, and more particularly to a signal pickup device constructed to enable a reproducing element which reproduces recorded signals from a rotary recording medium, to finely follow and trace the rotary recording medium regardless of the surface oscillation of the rotary recording medium introduced upon rotation of the rotary recording medium.

Generally, surface oscillation is introduced when a rotary recording medium (hereinafter referred to as disc) is rotated at high speed, and the signal recording surface of the disc undergoes microscopic oscillation. This oscillation includes low frequency components and their harmonic frequency components due to the surface oscillation caused by the imperfect recording surface of the disc, that is, since the recording surface of the disc is not completely flat, and irregularities exist on the recording surface. Furthermore, the above oscillation also includes mid-range frequency components due to vibration in the reproducing apparatus and the like, and low frequency repeated component of a signal recorded as pits formed intermittently on the disc surface (the horizontal synchronizing signal, vertical synchronizing signal, and tracking reference signal in a video signal, for example) and the like. Accordingly, the above oscillation extends in a frequency range from approximately 15 Hz to approximately 16 kHz.

The reproducing element which relatively scans the recording surface of the disc and reproduces the recorded signal, is required to finely trace and scan the recording surface of the disc regardless of the surface oscillation and vibration, and reproduce the recorded signal from the disc with desirable S/N (signal-to-noise) ratio.

Furthermore, even when pressure is applied to the reproducing element so that the reproducing element finely traces and scans the disc surface regardless of the surface oscillation and vibration of the disc, the amount of the above pressure which can be applied to the reproducing element is limited so as not to introduce scratches in either the reproducing element or the disc.

Moreover, the tracing limit of the reproducing element when the reproducing element is supported and pressed against the disc with a constant force, is determined by a constant acceleration defined by the equivalent mass at a tip end of a cantilever which supports the reproducing element, and the pressing force applied to the reproducing element. When the acceleration of the disc oscillation becomes larger than the above acceleration, the reproducing element cannot perform the tracing and scanning of the signal recording surface of the disc.

In a signal pickup apparatus comprising tracking control means for applying a force which applies stylus pressure on a reproducing stylus, and a force which displaces the reproducing stylus in a direction perpendicular with respect to the track longitudinal direction of the disc and performs the tracking control, to the rear end of a cantilever which supports the reproducing element at the tip end thereat, a tracking shift signal obtained from the reproduced signal is applied to tracking control means by use of a tracking servo loop. The above operation is performed in order to compensate for the distortion in the track and eccentricity introduced upon formation of the disc, of the forwarding movement error in an apparatus which subjects the reproducing element to perform a forwarding movement in the radial direction of the disc, and the like. Normally, when the above type of a tracking servo loop is an open servo loop, the tracking control signal is fed back having a gain of 70 dB, for example, with respect to the movement of the tip end of the cantilever, and designed so that the response extends to sufficiently high frequencies. The resonant frequency of the parasitic vibration due to the displacing movement of the cantilever which is included in this tracking servo loop, must be sufficiently higher than the frequency fc (1.5 kHz, for example) at which the above gain becomes zero.

SUMMARY OF THE INVENTION

Accordingly, a general object of the present invention is to provide a novel and useful signal pickup device in a rotary recording medium reproducing apparatus which enables a reproducing element to finely trace the recording surface of a disc by considering the above, and in which the above described problems have been overcome.

Another and more specific object of the present invention is to provide a signal pickup device in a rotary recording medium reproducing apparatus in which a reproducing element is mounted at one end of a plate-shaped member of which other end is supported by the tip end of a cantilever.

Still another object of the present invention is to provide a signal pickup device comprising a cantilever assembly having an viscoelastic plate-shaped member provided between the cantilever and the reproducing element. According to the apparatus of the present invention, the reproducing element can finely follow and trace the recording surface of the rotary recording medium regardless of the surface oscillation of the rotary recording medium, and can also be subjected to fine tracking control.

Other objects and further features of the present invention will be apparent from the following description when read in conjunction with the accompanying drawings.

DETAILED DESCRIPTION

Figure 1:
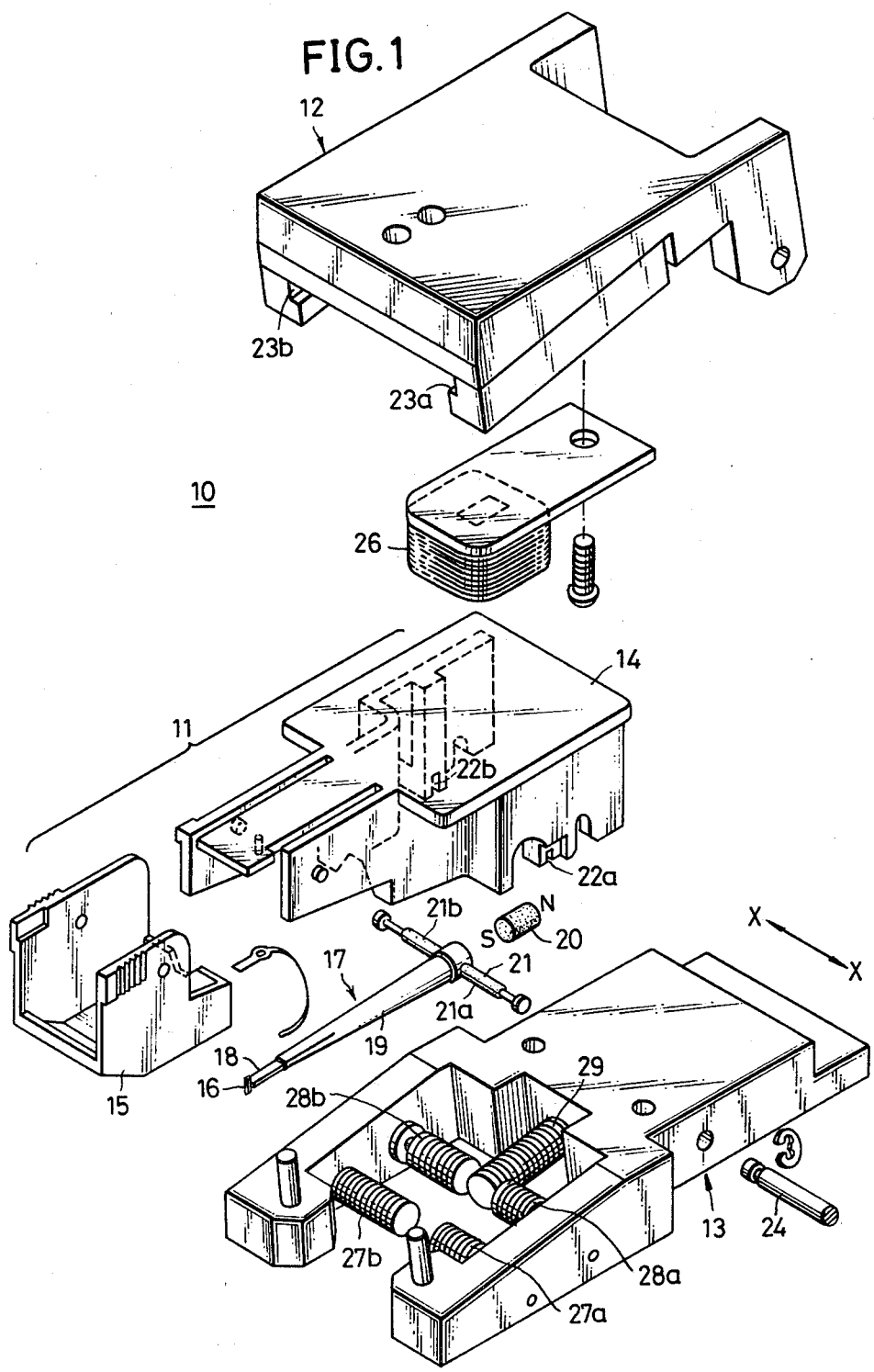
FIG. 1 is a exploded perspective view of an embodiment of a signal pickup device according to the present invention.
Figure 2:
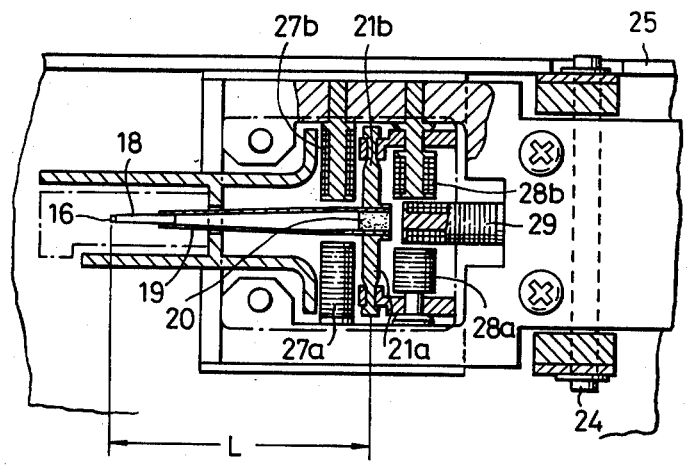
FIG. 2 is a plan view with a part cut away, of the signal pickup device of FIG. 1 in an assembled state.

In FIGS. 1 and 2, a signal pickup device 10 substantially comprises a cartridge 11, a guide member 12 for receiving and rotating the cartridge 11, and a fixed coil mounting member 13 mounted with a coil group. The cartridge 11 comprises a case 14, a lid 15, and a cantilever assembly 17 mounted with a reproducing stylus 16.

In the cantilever assembly 17 which constructs an essential part of the device of the present invention, the reproducing stylus 16 is mounted at the tip end of a plate-shaped holder 18. The rear end of the holder 18 is mounted to the tip end of a cantilever 19 constructed from a pipe made of light metal such as aluminum. The tip end of the cantilever 19 is a flat rectangular shaped pipe so that the rear end of the holder 18 can be inserted and fixed therein, or a flat shape so that the rear end of the holder 18 can be embeddedly fixed thereto. The part between the front end and the pipe-shaped part of the cantilever 19, is of a shape which smoothly connects the shapes on both sides of the cantilever 19. The cantilever 19 is formed by forming the small-diameter end of a tapered pipe having circular cross-section, being seamless or comprising seams, into a flat rectangular shape, or by forming from a thin plate and subjecting to bending and welding process.

The holder 18 is made from a flat polypropylene plate, for example, in which the thickness t is 0.3 milimeters, the width b is 1.4 mili-meters, and the length l is 5 mili-meters. The holder 18 can be made from materials such as nylon, polyethylene, and butyl rubber, which has both elasticity and viscocity. Furthermore, the reproducing stylus 16 comprises an electrode for reproducing signals as a variation in the electrostatic capacitance respective of the pits which are formed on the disc 40 in accordance with the signals, although the electrode is not shown in the drawings. Moreover, the holder 18 must be made of insulative material, since a conductive ribbon which makes conductive connection with the above electrode exists at the upper part of the holder 18.

When the length L of the cantilever 19 and the length of the holder 18 respectively are 30 mili-meters and 5 mili-meters, it is desirable for the thickness and width of the holder 18 to have a ratio relationship in which, when the width b of the holder 18 is one (unity), for example, the thickness is approximately 0.58 to 0.15. Furthermore, the holder 18 independently has a resonance frequency in the thickness direction of 2.7 kHz, and resonance frequency in the width direction of 12 kHz, for example, On the other hand, the resonance frequency in the thickness (vertical) direction is 800 Hz to 1.5 kHz, and the resonance frequency in the width direction is over 4 kHz for the cantilever assembly 17, for example.

In the present embodiment, 1.5 mili-meters of the rear end of the holder 18, for example, is inserted into the tip end rectangular opening of the cantilever 17, and fixedly adhered therein by an instant adhesive.

Then holder 18 is mounted so that the holder is in a parallel plane with respect to the recording surface of a rotary recording medium (disc) 40. A permanent magnet 20 having a cylindrical shape, is insertedly fixed to an intermediate space part at the rear end of the cantilever 19. The ring-shaped part of an elastic support member (suspension) 21 made of rubber, is insertedly connected to the rear end outer periphery of the cantilever 19. A pair of arms 21a and 21b unitarily extend in a direction perpendicular to the longitudinal direction of the cantilever 19, which are provided at both sides of the ring-shaped part of the support member 21.

The cantilever assembly 17 of the above described construction is contained within the case 14, wherein the arms 21a and 21b of the support member 21 are pushed and inserted into slots 22a and 22b of the case 14. The lid 15 is mounted freely rotatable on the case 14, and when the signal pickup apparatus is not used, the lid 15 is in a rotated position where the reproducing stylus 16 is protected. On the other hand, when the signal pickup apparatus is being used, the lid 15 is rotated into a position where the reproducing stylus is not interfered.

The guide member 12 comprises grooves 23a and 23b for receiving the cartridge 11, and is rotatably mounted on a fixed coil mounting member 13 by a shaft 24. A coil 26 is screwed onto the lower surface of the guide member 12.

The coil mounting member 13 is fixed to a carriage 25, and comprises tracking control coils 27a, 27b, 28a, and 28b, and jitter compensation coil 29 mounted thereon. The arms 21a and 21b of the elastic support member 21 in the above cantilever assembly 17, are respectively inserted in the spaces formed between the coils 27a and 28a, and the coils 27a and 27b. The axes of the coils 27a, 27b, 28a and 28b are arranged in a direction perpendicular to the magnetized direction of the permanent magnet 20. On the other hand, the axis of the coil 29 is arranged in the same direction as the magnetized direction of the permanent magnet 20.

In a state in which current is not applied to a coil 26, the cantilever 19 is supported by the support member 21, and the reproducing stylus 16 is positioned at a height where the reproducing stylus 16 does not make contact with a disc 40. Upon reproduction, when current is applied to the coil 26, the cantilever 19 receives a downward force, and rotates downward while twisting the support member 21. Accordingly, the reproducing stylus 16 is applied with a predetermined stylus pressure, and makes contact with the disc 40.

By flowing a current having a level and direction respective of the tracking error signal through the tracking control coils 27a, 27b, 28a, and 28b, opposite magnetic polarities are introduced at the edge surfaces of the opposing coils. Hence, repulsive force is introduced on one hand, and on the other, attractive force is introduced between the magnetic polarities of the permanent magnet 20. Accordingly, the cantilever 19 is displaced by a predetermined quantity in a direction the tracking deviation is to be compensated, in the radial direction of the disc 40 shown by arrow X of FIG. 3. Furthermore, when a jitter compensation current having a level and polarity respective of the jitter which is to be compensated, is passed through the jitter compensation coil 29, a magnetic field is introduced between the permanent magnet 20 and the coil 29. When a magnetic polarity which is the same as that of the permanent magnet 20 is introduced at the edge surface of the coil 29 opposing the permanent magnet 20, repulsive force is introduced between the coil 29 and the permanent magnet 20 and displaces the cantilever 19 in the direction shown by an arrow Z1, to compensate for the jitter. On the other hand, when a magnetic polarity which is opposite to that of the permanent magnet 20 is introduced at the edge surface of the coil 29 opposing the permanent magnet 20, attractive force is introduced between the coil 29 and the permanent magnet 20 and displaces the cantilever 19 in the direction shown by an arrow Z2, to compensate for the jitter.

In the present embodiment of the invention, the cantilever assembly 17 is subjected to divisional vibration at a predetermined frequency within the above signal pickup device, and the tracing acceleration having a frequency higher than that of the above predetermined frequency, to enable tracing which is applicable upon surface oscillation extending to a wide range. Therefore, the surface oscillation tracing characteristic of the cantilever assembly 17 becomes as follows. When the moment of inertia of the whole cantilever assembly 17, and the twisting spring constant of the support member 21 are respectively designated by $I_1$ and $K_\alpha$, the resonance frequency $f_1$ determined by the above two values, can be described by the following equation.

$$f_1 \approx \frac{1}{2\pi} \sqrt{\frac{K_\alpha}{I_1}} \text{ (Hz)} \tag{1}$$

Figure 4:
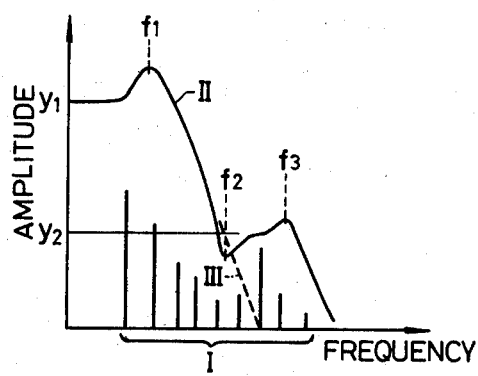
FIG. 4 is a graph showing the frequency spectrum of the disc surface oscillation, and the surface oscillation tracing characteristic of the signal pickup device according to the present invention.

A frequency spectrum of the disc surface oscillation, and the surface oscillation tracing amplitude characteristic of the signal pickup device according to the present invention, are shown in FIG. 4. The surface oscillation frequency of the disc 40 is distributed in a frequency range shown by a range I (15 Hz to 5 kHz, for example). The above resonance frequency $f_1$, for example, is approximately 25 Hz to 30 Hz. A curve II shows the surface oscillation tracing amplitude characteristic of the signal pickup device.

At a frequency lower than the above resonance frequency $f_1$, a quantity $y_1$, which is the quantity displaced downwards from the signal recording surface of the disc 40, in advance, by a static torque $\alpha$ of the support member 21, represents the surface oscillation tracing limit. In this case, the static pressing force F against the stylus, can be described by the following equation (2).

$$F \approx (y_1/L^2) \cdot K_\alpha \text{(gr)} \tag{2}$$

In the above equation (2), the symbol L designates the distance between the reproducing stylus 16 and the center axis of the support member 21 in the longitudinal direction.

On the other hand, at frequencies higher than the above resonance frequency $f_1$, the amplitude described by the equi-acceleration line (shown by dotted lines III of FIG. 4) of the following equation (3) is the surface oscillation tracing limit, where in equation (3), g designates the gravity accelleration.

$$a \approx (F \cdot L)/(I_1 \cdot g) \tag{3}$$

Figure 5:
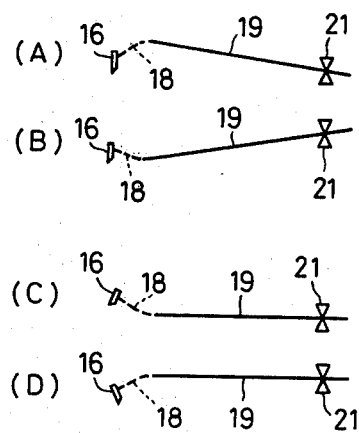
FIGS. 5(A) through 5(D) respectively are simplified diagrams for explaining the oscillating state of the cantilever assembly.

Accordingly, in the present embodiment of the invention, the line connecting the tip end of the holder 18 and the connection point between the holder 18 and the cantilever 19, tilt with respect to the force applied to the stylus 16. As a result, resonance is introduced as shown in FIGS. 5(A) and 5(B) at a frequency $f_2$ which can be described by the following equation (4), where the respective symbols $K_\theta$, $I_2$, and $l$ designate the spring constant of the holder 18, the moment of inertia of the part composed of the cantilever 19 and the permanent magnet 20 (this moment of inertia $I_2$ is substantially equal to the moment of inertia $I_1$ of the whole cantilever assembly 17), and the distance between the tip end of the holder 18 and the connection point between the holder 18 and the cantilever 19.

$$f_2 \approx \frac{L}{2\pi l} \sqrt{\frac{K_\theta}{I_2}} \text{ (Hz)} \tag{4}$$

Thus, when the Q-factor of the above resonance is designated by Q, the tracing amplitude at the resonance frequency $f_2$ is reduced to 1/Q of the original tracing amplitude, with respect to the $-40$ dB/dec equi-acceleration line in the surface oscillation tracing characteristic shown by the dotted lines III of FIG. 4.

Figure 3:
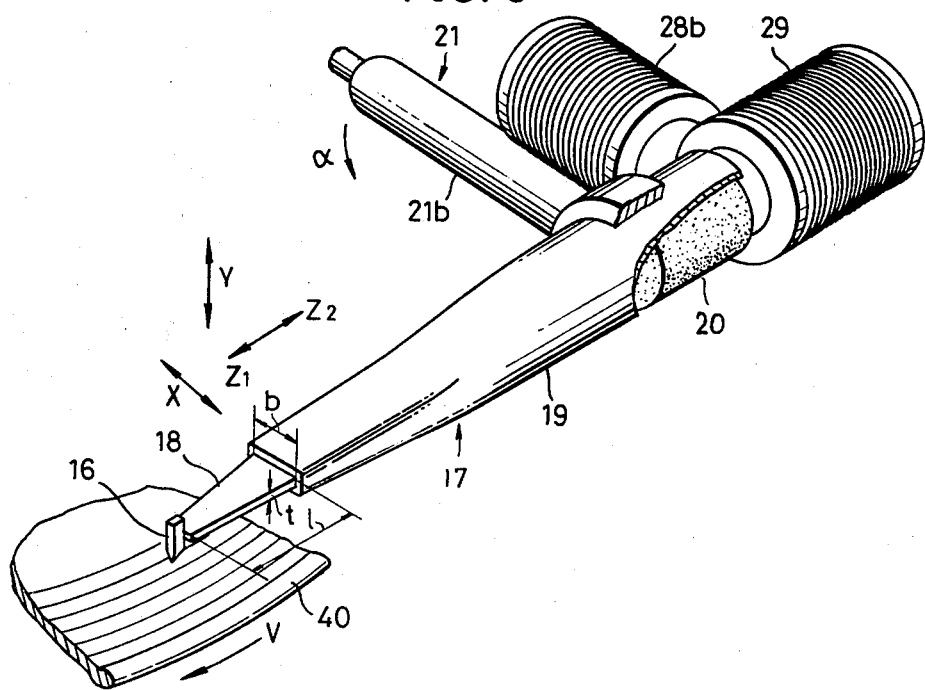
FIG. 3 is an enlarged perspective view of the essential part of the signal pickup device of FIG. 1 with a part cut away.

However, at a frequency higher than the resonance frequency $f_2$, the tracing amplitude is equal to the tracing amplitude $y_2$ in the static flexure quantity of the holder 18, up to a resonance frequency $f_3$ of the holder 18 in the vertical direction as shown by the arrow Y of FIG. 3. The above tracing quantity $y_2$ can be described by the following equation (5).

$$y_2 = (l^2 \cdot K_\alpha \cdot y_1)/(L^2 \cdot K_\theta) = l^2 F/K_\theta \tag{5}$$

Furthermore, when the frequency is higher than the resonance frequency $f_3$, an equi-acceleration line determined by the moment of inertia of the holder 18 (and the stylus 16) and the above spring constant $K_\theta$. The vibration state of the cantilever assembly in the above case, is shown in FIGS. 5(C) and 5(D).

Hence, the tracing amplitude characteristic of the present embodiment becomes as shown by the solid line II of FIG. 4. By setting the spring constant $K_\theta$ of the holder 18 to a predetermined value, and resonating at a resonance frequency $f_2$ as shown in FIGS. 5(A) and 5(B), the tracing amplitude decreases compared to that of the conventional apparatus at the neighboring frequencies of the resonance frequency $f_2$. However, the tracing amplitude at frequencies higher than the resonance frequency $f_2$, can be increased.

Moreover, the level of the surface oscillation frequency spectrum I gradually decreases with respect to the increase in the frequency, as shown in FIG. 4, and it is known that when the frequency is further increased, the level becomes a maximum value at a certain frequency. By selecting the resonance frequency $f_2$ of the cantilever assembly 17 at a frequency band lower than the surface oscillation frequency at the above maximum value, within the neighborhood of the surface oscillation frequency which indicates the minimum surface oscillation amplitude, the cantilever assembly 17 can then finely trace according to the surface oscillation.

As described above, the cantilever 19 is subjected to the microscopic displacement and control by the tracking control coils 27a through 28b, in the direction shown by the arrow X of FIG. 3. It is essential that the force applied to the base part of the cantilever 19 by the above coils 27a through 28b accurately displace the stylus 16 in the direction of the arrow X. In order for the above to be performed, the resonance point of the cantilever assembly 17 in the direction of the arrow X of FIG. 3 (within the horizontal plane), must be in a frequency band higher than the frequency $f_c$ of the frequency characteristic in the tracking open servo loop at which frequency the response becomes 0 dB. Hence, in the present embodiment, rigidity is obtained in the vertical and the horizontal directions, by shaping the tip end part of the cantilever 19 and the holder 18 into wide flat plate-shaped members.

Accordingly, when the thickness (length in the direction of the arrow Y) of the holder 18, and the width (length in the direction of the arrow X) at the connection point between the holder 18 and the cantilever 19, are respectively designated by t and b, the relationship between the resonance frequency of the holder 18 in the Y direction (vertical direction) which is $f_Y(=f_3)$ and the X direction (horizontal direction) which is $f_X$ of FIG. 3, are as follows.

$$f_x/f_y = b/t \qquad (6)$$

Therefore, by making the holder 18 wide, that is making $b>t$, a cantilever assembly 17 having a resonance frequency $f_2$ of a predetermined value, and resonance frequency in the horizontal direction higher than the frequency $f_c$, can easily be designed and manufactured. Moreover, when the number of rotations of the disc is 900 rpm, the frequency $f_c$ is approximately 1.5 to 2 kHz, and the frequency $f_2$ is approximately 500 to 800 Hz.

Furthermore, the resonance frequencies $f_2$ and $f_3$ can be selected independently from each other, and for example, when the weight of the holder 18 is reduced, only the resonance frequency $f_3$ can be shifted in the high frequency range.

Further, this invention is not limited to these embodiments but various variations and modifications may be made without departing from the scope of the invention.

What is claimed is:

1. A signal pickup device comprising:
   a reproducing element for reproducing recorded signals from recording tracks of a rotary recording medium;
   a holder having said reproducing element mounted at its tip end;
   a cantilever having the rear end of said holder mounted at its tip end;
   force applying means for applying a force to the rear end side of said cantilever so that said reproducing element makes contact with said rotary recording medium having a predetermined pressure; and
   control means for applying force at the rear end side of said cantilever so that tracking control is performed, by displacing said reproducing element in a direction perpendicular with respect to the longitudinal direction of the recording tracks of said rotary recording medium, said cantilever, holder and reproducing element constructing a cantilever assembly,
   said holder forming a plate-shaped member in which the width in the direction substantially parallel to the rotating surface of said rotary recording medium is larger than the thickness in the direction perpendicular to said rotating surface,
   said holder and said cantilever assembly having a first resonance frequency respective of their spring constant and moment of inertia wherein said resonance frequency is selected at a frequency lower than a frequency $f_c$ at which the response of the open servo loop characteristic of said control means becomes zero, and said cantilever having a second resonance frequency at the plane substantially parallel to the rotating surface of said rotary recording medium selected at a frequency higher than said frequency $f_c$ at the rear end side thereof.

2. A device as claimed in claim 1 in which said holder comprises a flat plate made of insulative and viscoelastic material.

3. A device as claimed in claim 2 in which said holder is made from a selected group of materials including polypropylene, nylon, polyethylene, and rubber.

4. A device as claimed in claim 1 in which the ratio between the width b and the thickness t of said holder is in relation such that, when the width b is one, the thickness t is selected within a range having values from 0.58 to 0.15.

5. A device as claimed in claim 1 in which said first resonance frequency is selected at a frequency substantially equal to the surface oscillation frequency which indicates the minimum value of the surface oscillation amplitude in the surface oscillation frequency spectrum of said rotary recording medium.

6. A device as claimed in claim 1 in which said cantilever comprises a hollow pipe member, and said cantilever having its tip end formed into a flat rectangular pipe shape which holds the rear end of said holder inserted and fixed therein.

7. A device as claimed in claim 1 in which said cantilever assembly performs a divisional vibration at a predetermined frequency.

8. A device as claimed in claim 1 which comprises a resonance frequency at a frequency f which can be described by an equation $$f \approx \frac{L}{2\pi l} \sqrt{\frac{K_\theta}{I}} \text{ (Hz)}$$

where L, l, $K_\theta$, and I respectively designate the distance between said reproducing element and the rotation axis of said cantilever, the distance between a reproducing stylus and the connection point between said holder and said cantilever, the spring constant of said holder, and the moment of inertia of said cantilever assembly.

* * * * *